US012573962B2

(12) United States Patent
Yang et al.

(10) Patent No.: US 12,573,962 B2
(45) Date of Patent: Mar. 10, 2026

(54) ISOLATED POWER SUPPLY CONTROL CIRCUIT AND ISOLATED POWER SUPPLY

(71) Applicant: SHANGHAI BRIGHT POWER SEMICONDUCTOR CO., LTD., Shanghai (CN)

(72) Inventors: Pengbo Yang, Shanghai (CN); Zhen Zhu, Shanghai (CN); Xiaoru Gao, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 188 days.

(21) Appl. No.: 18/545,326

(22) Filed: Dec. 19, 2023

(65) Prior Publication Data

US 2024/0223098 A1 Jul. 4, 2024

(30) Foreign Application Priority Data

Dec. 30, 2022 (CN) .......................... 202211730582.X

(51) Int. Cl.
*H02M 3/335* (2006.01)
*H02M 1/38* (2007.01)

(52) U.S. Cl.
CPC ......... *H02M 3/33592* (2013.01); *H02M 1/38* (2013.01); *H02M 3/33507* (2013.01)

(58) Field of Classification Search
CPC ......... H02M 3/33592; H02M 3/33507; H02M 1/38; H02M 1/385
See application file for complete search history.

(56) References Cited

U.S. PATENT DOCUMENTS

2018/0351462 A1* 12/2018 Li ..................... H02M 3/33507
2020/0112266 A1* 4/2020 Hara ................. H02M 3/33523

* cited by examiner

*Primary Examiner* — Alex Torres-Rivera
(74) *Attorney, Agent, or Firm* — MUNCY, GEISSLER, OLDS & LOWE, P.C.

(57) ABSTRACT

A control circuit for an isolated power supply and an isolated power supply are disclosed. The control circuit includes a secondary control signal generation circuit, which, when detecting a voltage of a secondary winding reaches a first preset voltage value after a primary switching transistor is turned off, provides an instruction to turn on a synchronous rectification transistor. Following elapse of a predetermined period of time after the synchronous rectification transistor is turned on, the secondary control signal generation circuit detects a voltage/current of the synchronous rectification transistor, obtains a first electrical signal and derives a second electrical signal from the first electrical signal. When further detecting that the voltage/current of the synchronous rectification transistor reaches the value of the second electrical signal, the secondary control signal generation circuit provides an instruction to turn off the synchronous rectification transistor.

15 Claims, 4 Drawing Sheets

131

1312

ISOLATED POWER SUPPLY CONTROL CIRCUIT AND ISOLATED POWER SUPPLY

CROSS-REFERENCE TO RELATED APPLICATION

This application claims the priority of Chinese patent application number 202211730582.X, filed on Dec. 30, 2022, and entitled "ISOLATED POWER SUPPLY CONTROL CIRCUIT AND ISOLATED POWER SUPPLY", the entire contents of which are incorporated herein by reference.

TECHNICAL FIELD

This disclosure relates to the field of electronic circuits and, in particular, to an isolated power supply control circuit and an isolated power supply.

BACKGROUND

In existing isolated power supplies, turn-on and turn-off instants for a synchronous rectification transistor are typically determined by detecting a voltage across two terminals of a secondary winding and a slope of the voltage signal across two terminals of a secondary winding. For example, the synchronous rectification transistor may be turned on when the voltage across the secondary winding reaches a voltage threshold and may be turned off when the voltage across the terminals of the secondary winding rises rapidly and undergoes a zero-crossing. When this determination method operates in a continuous inductor current mode (CCM), the synchronous rectification transistor will be turned off as a result of a rapid rise of the voltage across the terminals of the secondary winding only when the primary switching transistor has been turned on. Since the synchronous rectification transistor is turned off always after the primary switching transistor is turned on, there is a chance for simultaneous conduction of the primary and secondary circuits during operation of the isolated power supply. When this happens, current limitation is necessary in order to prevent breakdown, which, however, may degrade conversion efficiency of the isolated power supply.

In view of this, further improvement of the prior art would be desirable, and it would be advantageous to have a control circuit for an isolated power supply, which can operate in both CCM and DCM modes while providing increased safety and efficiency by allowing more precise conduction time control over a synchronous rectification transistor.

SUMMARY OF THE INVENTION

In this disclosure, a control circuit for an isolated power supply is provided. The isolated power supply comprises: a transformer comprising a primary winding and a secondary winding; a primary switching transistor coupled to the primary winding; and a synchronous rectification transistor coupled to the secondary winding. The control circuit comprises: a secondary control signal generation circuit comprising: an input terminal at least electrically connected to a node, to which the secondary winding and the synchronous rectification transistor are connected; and an output terminal for outputting a control signal for the synchronous rectification transistor, wherein after the primary switching transistor is turned off, the secondary control signal generation circuit is configured to, when detecting that a voltage at the node, to which the secondary winding and the synchronous rectification transistor are connected, reaches a preset turn-on voltage value, provide an instruction to turn on the synchronous rectification transistor; and after the elapse of a predetermined period of time after the synchronous rectification transistor is turned on, the secondary control signal generation circuit is configured to detect a voltage/current of the synchronous rectification transistor, obtain a first electrical signal and derive a second electrical signal from the first electrical signal. A value of the second electrical signal is in a predetermined proportion to a value of the first electrical signal. When further detecting that the voltage/current of the synchronous rectification transistor reaches the value of the second electrical signal, the secondary control signal generation circuit is configured to provide an instruction to turn off the synchronous rectification transistor.

In one possible embodiment, one terminal of the synchronous rectification transistor may be electrically connected to the secondary winding, and another terminal thereof may be connected to a ground terminal. The secondary control signal generation circuit may detect the voltage/current of the synchronous rectification transistor by detecting a voltage/current at a node, to which the synchronous rectification transistor and the secondary winding are connected.

In one possible embodiment, the secondary control signal generation circuit may comprise a control signal generation unit. The control signal generation unit may comprise: an input terminal electrically connected to the secondary winding; and an output terminal electrically connected to an input terminal of the synchronous rectification transistor. The control signal generation unit may be configured to: i) determine an instant, at which a voltage value of a voltage signal of the secondary winding reaches a first preset voltage value after the primary switching transistor is turned off, as a turn-on instant of the synchronous rectification transistor; ii) after the elapse of the predetermined period of time after the synchronous rectification transistor is turned on, detect the voltage/current of the synchronous rectification transistor, obtain the first electrical signal and derive the second electrical signal from the first electrical signal; iii) determine an instant, at which the voltage/current of the synchronous rectification transistor reaches the value of the second electrical signal, as a turn-off instant of the synchronous rectification transistor; and iv) generate a switching signal based on the turn-on and turn-off instants of the synchronous rectification transistor and the output the switching signal to the synchronous rectification transistor.

In one possible embodiment, the control signal generation unit may comprise: a first signal generation unit comprising: an input terminal electrically connected to the secondary winding; and an output terminal electrically connected to the synchronous rectification transistor, the first signal generation unit configured to: determine the instant, at which the voltage value of the voltage signal of the secondary winding reaches the first preset voltage value after the primary switching transistor is turned off, as the turn-on instant of the synchronous rectification transistor; and generate and output a rising edge of the switching signal based on the turn-on instant of the synchronous rectification transistor; and a second signal generation unit comprising: an input terminal electrically connected to the secondary winding; and an output terminal electrically connected to the synchronous rectification transistor, the second signal generation unit configured to: after the elapse of the predetermined period of time after the synchronous rectification transistor is turned on, detect the voltage/current of the synchronous rectification transistor; obtain the first electrical signal; derive the second electrical signal from the first electrical signal; determine the instant, at which the voltage/current of the synchronous rectification transistor reaches the value of the second electrical signal, as the turn-off instant of the synchronous rectification transistor; and generate and output a falling edge of the switching signal based on the turn-off instant of the synchronous rectification transistor.

In one possible embodiment, the second signal generation unit may comprise: a first electrical signal generation element comprising an input terminal electrically connected to the secondary winding and configured to sample, hold and output the first electrical signal, wherein the value of the first electrical signal is equal to a value of the voltage or current signal of the secondary winding signal after the predetermined period of time after the synchronous rectification transistor is turned on; a proportion calculation unit comprising an input terminal electrically connected to an output terminal of the first electrical signal generation unit, the proportion calculation unit configured to derive the value of the second electrical signal from the value of the first electrical signal according to the predetermined proportion, generate the second electrical signal based on the value of the second electrical signal and output the second electrical signal; and a comparison unit comprising: a first input terminal electrically connected to an output terminal of the proportion calculation unit; a second input terminal electrically connected to the secondary winding; and an output terminal electrically connected to the synchronous rectification transistor, the comparison unit configured to: compare the value of the second electrical signal with the voltage/ current of the synchronous rectification transistor; and generate and output the falling edge of the switching signal when the voltage/current of the synchronous rectification transistor reaches the value of the second electrical signal.

In one possible embodiment, the comparison unit may comprise a voltage comparison unit comprising: a first input terminal electrically connected to the output terminal of the proportion calculation unit; a second input terminal electrically connected to the secondary winding; and an output terminal electrically connected to the synchronous rectification transistor. The voltage comparison unit may be configured to: compare the value of the second electrical signal with the voltage of the synchronous rectification transistor; and generate and output the falling edge of the switching signal when the voltage of the synchronous rectification transistor reaches the value of the second electrical signal.

In one possible embodiment, the comparison unit may comprise a current comparison unit comprising: a first input terminal electrically connected to the output terminal of the proportion calculation unit; a second input terminal electrically connected to the secondary winding; and an output terminal electrically connected to the synchronous rectification transistor. The current comparison unit may be configured to: compare the value of the second electrical signal with the current of the synchronous rectification transistor; and generate and output the falling edge of the switching signal when the current of the synchronous rectification transistor reaches the value of the second electrical signal.

In one possible embodiment, the primary switch control circuit may comprise a logic module comprising: an input terminal electrically connected to the output terminal of the secondary control signal generation circuit. The logic module may be configured to generate and output a first control signal in an off-state of the synchronous rectification transistor. The primary switch control circuit may further comprise a transmitter module comprising an input terminal electrically connected to an output terminal of the logic module. The transmitter module may be configured to, upon receiving the first control signal, transmit the first control signal. The primary switch control circuit may further comprise a primary control module comprising: an input terminal coupled to an output terminal of the transmitter module; and an output terminal electrically connected to a control terminal of the primary switching transistor. The primary control module may be configured to, upon receiving the first control signal, turn on the primary switching transistor.

In one possible embodiment, a conduction time of the synchronous rectification transistor may be positively correlated to an absolute current value of the synchronous rectification transistor when the synchronous rectification transistor is on.

In another aspect of this disclosure, an isolated power supply comprising the control circuit as defined above is provided.

The control circuit provided in the disclosure is able to turn on or off of the synchronous rectification transistor based on either or both of the voltage and current signals of the secondary winding. Specifically, the synchronous rectification transistor is turned on when the voltage signal of the secondary winding reaches the first predetermined value after the primary switching transistor is turned off and it is turned off when the value of the voltage or current signal of the secondary winding becomes equal to the value of the second electrical signal. This entails self-adaptive turn-on and turn-off control over the synchronous rectification transistor.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present disclosure and, together with the description, serve to explain the principles of the disclosure.

DETAILED DESCRIPTION

Figure 1:
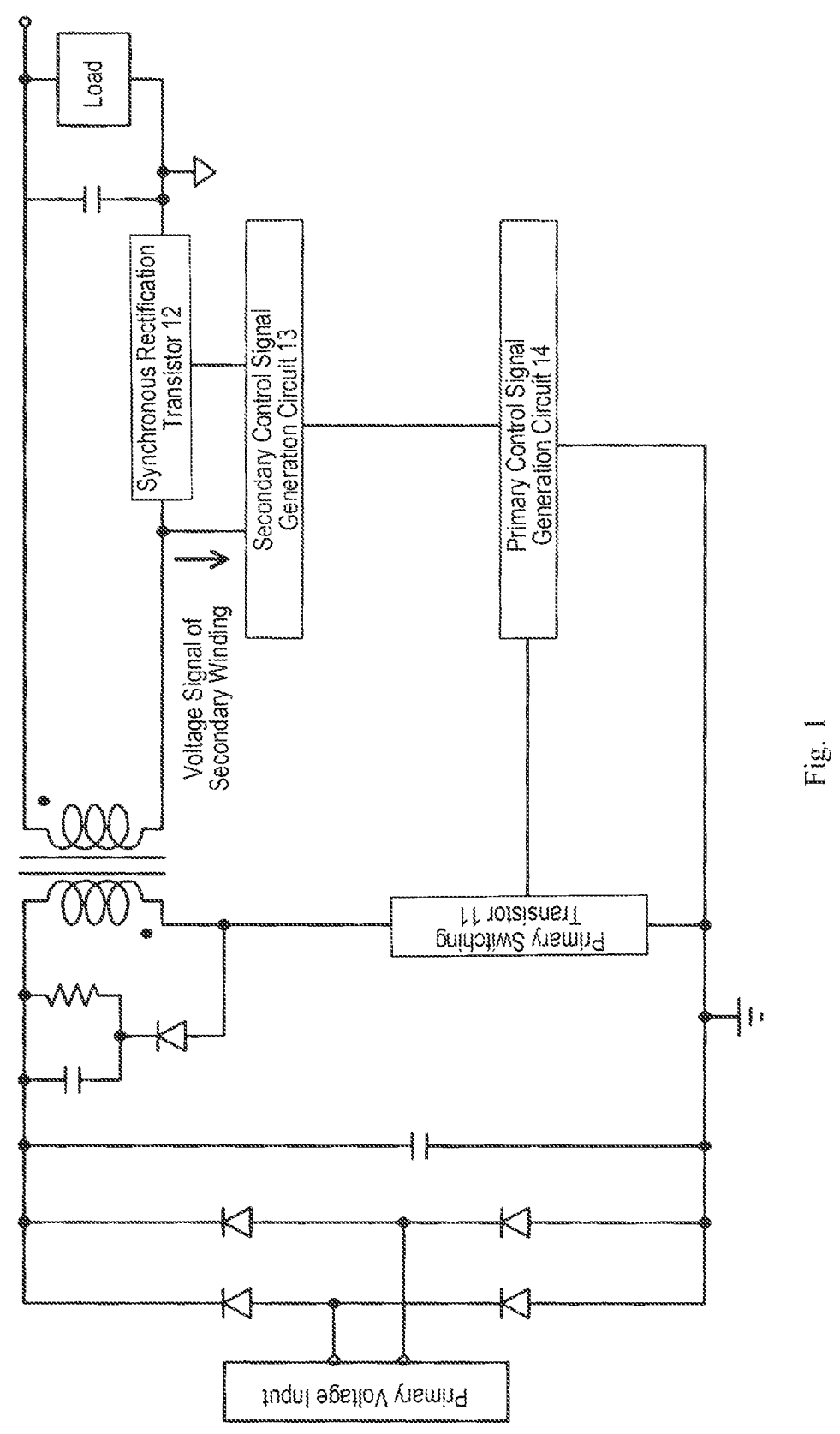
FIG. 1 is a schematic circuit diagram of an isolated power supply according to an embodiment of the present disclosure.

Various exemplary embodiments, features and aspects of the disclosure will be described in detail below with reference to the accompanying drawings. Elements of same function are represented with same reference numerals throughout the figures. While the various aspects of the embodiments are presented in the drawings, the figures are not necessarily drawn to scale, unless specifically indicated.

The term "exemplary" is used herein to mean serving as an example, instance, or illustration. Any embodiment described herein as "exemplary" is not necessarily to be construed as preferred or advantageous over other embodiments.

In order to facilitate description of the disclosure, numerous specific details are set forth in the following particular embodiments. Those skilled in the art will understand that this disclosure may be practiced without some of the specific details. In some instances, methods, means, elements and circuits well known to those skilled in the art have not been described in particular detail in order to avoid unnecessarily obscuring the disclosure.

Referring to FIG. 1, in this disclosure, a control circuit for an isolated power supply is provided. In the embodiment shown in FIG. 1, the isolated power supply includes: a transformer having a primary winding and a secondary winding; a primary switching transistor 11 coupled to the primary winding; and a synchronous rectification transistor coupled to the secondary winding. The primary switching transistor 11 has: a first terminal electrically connected to the primary winding of the isolated power supply; a second terminal electrically connected to a ground terminal; and a control terminal electrically connected to an output terminal of a primary control signal generation circuit 14. In the illustrated embodiment, the synchronous rectification transistor 12 has: a first terminal electrically connected to the secondary winding of the isolated power supply; a second terminal electrically connected to a ground terminal; and a control terminal electrically connected to an output terminal of a secondary control signal generation circuit 13. In other embodiments, the synchronous rectification transistor may be connected between one terminal of the secondary winding and a secondary output terminal.

For example, with continued reference to FIG. 1, an input terminal of the secondary control signal generation circuit 13 may be electrically connected at least to the secondary winding, and its output terminal may output a control signal for the synchronous rectification transistor 12. After the primary switching transistor 11 is turned off, upon detecting that a voltage at a node, to which the secondary winding and the synchronous rectification transistor are connected, reaches a preset turn-on voltage value, the secondary control signal generation circuit 13 may provide an instruction to turn on the synchronous rectification transistor 12. After the synchronous rectification transistor 12 is turned on, the secondary control signal generation circuit 13 may detect a first electrical signal and, upon the synchronous rectification transistor 12 reaching a steady state, may obtain a first value of the first electrical signal. The first electrical signal may reflect a current flowing through the synchronous rectification transistor 13. The secondary control signal generation circuit 12 may further obtain a second value from the first value, which may be in a predetermined proportion to the first value. When further detecting that the first electrical signal reaches the second value, the secondary control signal generation circuit 13 may provide an instruction to turn off the synchronous rectification transistor 12.

The control circuit may control a conduction time of the synchronous rectification transistor in a self-adaptive manner in each operation cycle, which is defined as a duration of time required by the synchronous rectification transistor to reach a steady state. This duration of time may be determined by an instant of reaching a steady state by a current flowing through the synchronous rectification transistor 12 after the transistor is turned on. As would be appreciated by those skilled in the art, by "instant of reaching a steady state", it is not intended to mean that such an instant is unique. The instant at which the synchronous rectification transistor 12 reaches a steady state after it is turned on may be manually determined to be any instant of time when a signal characterizing and reflecting the current flowing through the synchronous rectification transistor can be sensed, which does not jitter or transition any longer. The characterizing signal may comprise various forms each corresponding to a different "instant of reaching a steady state". For example, in the illustrated embodiment, the duration of time required by the transistor to reach a steady state after it is turned on is configured as a constant length of time after it is turned on. In this way, the conduction time is only determined by the first value acquired when the current flowing through the synchronous rectification transistor 12 reaches a steady state after it is turned on. The conduction time may be positively correlated to the first value. That is, the greater the first value, the longer the conduction time; and the smaller the first value, the shorter the conduction time. In the illustrated embodiment, the conduction time or the instant of reaching a steady state by the current flowing through the synchronous rectification transistor 12 after it is turned on may be in a linear relationship, and the first value may through its proportional relationship with the second value, eventually have an impact on the conduction time. Specifically, the conduction time may be equal to the sum of a duration of time required to reach a steady state and a duration of time required by the first electrical signal to change from the first value to the second value. After the synchronous rectification transistor is turned on, the absolute value of the current flowing through the synchronous rectification transistor will gradually decrease, and a slope of the decrease is determined by an output voltage and a secondary inductance and remains substantially constant throughout the entire cycle of operation. In case of the second value being in proportion to the first value, the absolute value of the duration of time required by the first electrical signal to change from the first value to the second value is also proportional to the first value, and the conduction time is therefore in a linear relationship with the first value. Nevertheless, the conduction time is not necessarily in a linear relationship with the first value. For example, in other embodiments, there may be another relationship between the first and second values. For example, in another embodiment, the first value may be mapped to the second value through a mapping relationship and thus eventually have an impact on the conduction time. That is, conduction time may be determined by looking up a mapping table.

In the illustrated embodiment, the first electrical signal may be a voltage sampled at a node, to which the secondary winding and the synchronous rectification transistor 12 are connected. As another terminal of the synchronous rectification transistor is connected to the ground, the voltage at the node can reflect the voltage across the two terminals of the synchronous rectification transistor 12. Moreover, when the synchronous rectification transistor is completely turned on, its on-resistance can be considered as being constant when the current flowing through it varies within a relatively small range. Therefore, the voltage across the two terminals of the synchronous rectification transistor 12 can also reflect the current flowing through the synchronous rectification transistor. Thus, the voltage sampled at the node taken as the first electrical signal can reflect the current flowing through the synchronous rectification transistor. Those skilled in the art would appreciate that, instead of connecting to the ground, the synchronous rectification transistor 12 may also be electrically connected to another secondary reference with a fixed potential. For instance, in case of an isolated constant-voltage converter, the secondary output terminal is subject to constant-voltage control and can be considered as a suitable reference. In this case, it is still possible to sample the first electrical signal at the node.

In these embodiments, since the first electrical signal is the voltage sampled at the node, to which the secondary winding and the synchronous rectification transistor 12 are connected, it may also be used to determine whether the voltage at the node, to which the secondary winding and the synchronous rectification transistor are connected, reaches the preset turn-on voltage value.

In other embodiments, the first electrical signal may be a directly sampled from the current flowing through the synchronous rectification transistor, rather than of the voltage at the node, to which the secondary winding and the synchronous rectification transistor 12 are connected. For example, the current flowing through the synchronous rectification transistor may be sampled using any suitable conventional technique commonly used for this purpose, such as current mirroring, or a technique based on a current sensing resistor. Detailed description thereof is omitted herein for the sake of brevity.

Operation of the control circuit will be exemplified in detail below with reference to waveform of the voltage signal at the node, to which the secondary winding and the synchronous rectification transistor are connected (referred to hereinafter as "the voltage signal of the secondary winding" and labeled in the figures as "Voltage Signal of Secondary Winding") and waveform of the current signal flowing through the synchronous rectification transistor (referred to hereinafter as "the current signal of the secondary winding" and labeled in the figures as "Current Signal of Secondary Winding").

Figure 4:
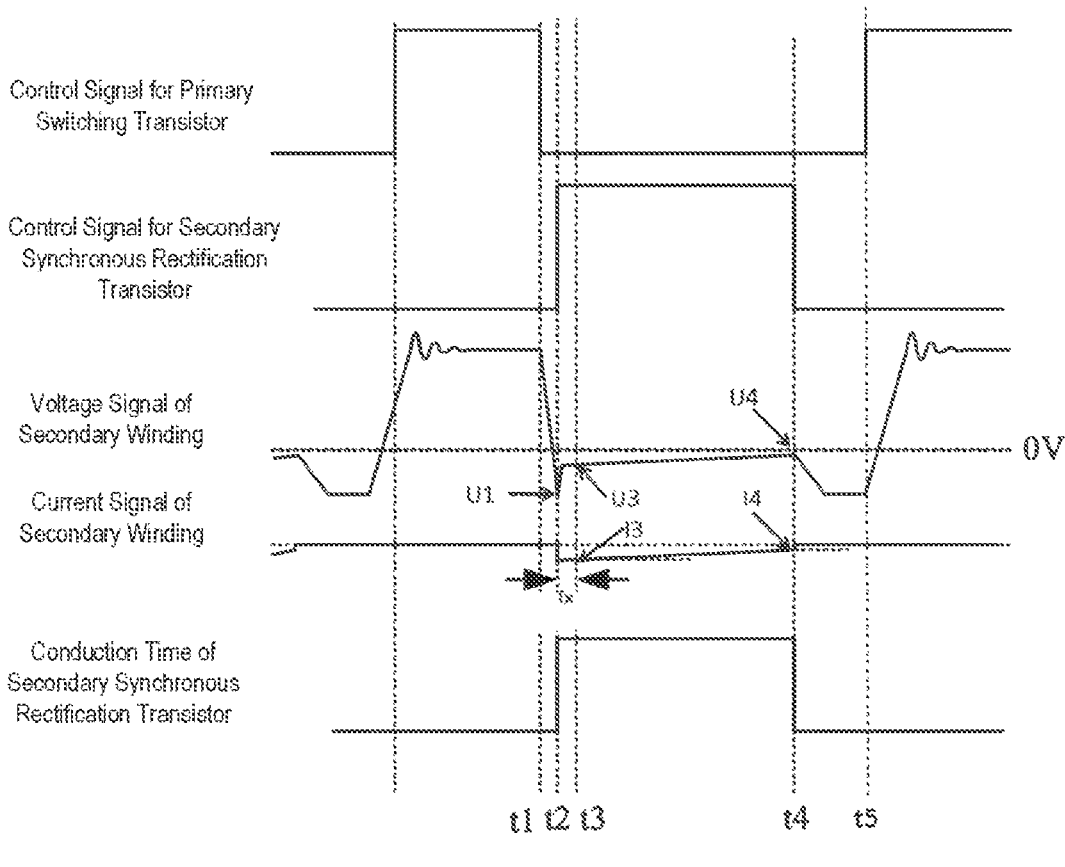
FIG. 4 schematically illustrates waveforms of signals in an isolated power supply according to an embodiment of the disclosure.

For example, the voltage labeled as U1 in FIG. 4 may be taken as the preset turn-on voltage value. As can be seen from a control signal for the primary switching transistor and the voltage signal of the secondary winding shown in FIG. 4, the primary switching transistor 11 is turned off at instant t1, leading to a drop in the voltage signal of the secondary winding. At instant t2, the voltage signal of the secondary winding reaches U1, i.e., the preset turn-on voltage value. At this point, the synchronous rectification transistor 12 is turned on under the control of the secondary control signal generation circuit 13. The value of the preset turn-on voltage value may be set as required by those skilled in the art. In the illustrated embodiment, the voltage signal of the secondary winding may be taken as the first electrical signal that serves as a basis for determination. After the elapse of a predetermined period of time Tx, the synchronous rectification transistor reaches a steady state at instant t3. The first value of the first electrical signal may correspond to U3 of the voltage signal of the secondary winding in FIG. 4. In case of the first electrical signal being directly sampled from the current signal flowing through the synchronous rectification transistor, the predetermined period of time may also be Tx in FIG. 4 as an example, and the first value of the first electrical signal may correspond to I3 of the current signal of the secondary winding in FIG. 4. The secondary control signal generation circuit 13 may determine the second value from the first value of the first electrical signal (i.e., the voltage value U3, or the current value I3, in FIG. 4) and the predetermined proportion. For ease of understanding, specific numerical data are given below. In the example where the predetermined period of time is Tx and the first value of the first electrical signal corresponds to U3 in FIG. 4, if the first value of the first electrical signal is −5 mV and the predetermined proportion is ⅕, then the second value can be calculated to be −1 mV (e.g., corresponding to U4 of the voltage signal of the secondary winding). In the example where the predetermined period of time is Tx and the first value corresponds to I3 of the current signal of the secondary winding in FIG. 4, if the first value is −5 mA and the predetermined proportion is ⅕, then the second value can be calculated to be −1 mA (e.g., corresponding to I4 of the current signal of the secondary winding). At instant t4 in FIG. 4, the voltage signal of the secondary winding reaches U4, or the current signal thereof reaches I4. At the same time, the synchronous rectification transistor is turned off under the control of the secondary control signal generation circuit 13.

In some implementations of the illustrated embodiment, the control circuit can utilize either voltage signal of the secondary winding alone, or together with a direct sample of the current flowing through the synchronous rectification transistor, to turn on or off the synchronous rectification transistor in such a manner that, after the primary switching transistor is turned off, the synchronous rectification transistor is turned on upon the voltage signal of the secondary winding reaching the preset turn-on value and turned off when the voltage or current signal of the secondary winding reaches the second value. Since the second value actually depends on the value of the current flowing through the synchronous rectification transistor at the instant at which the synchronous rectification transistor reaches a steady state, the synchronous rectification transistor can be controlled to be turned on and off in a self-adaptive manner.

In one possible embodiment, the primary control signal generation circuit 14 is configured to turn on the primary switching transistor 11 when the synchronous rectification transistor 12 is in an off-state. For example, with continued reference to FIG. 4, as can be seen from the control signal for the primary switching transistor and the control signal for the synchronous rectification transistor, the synchronous rectification transistor 12 transfers from an on-state to an off-state at instant t4, and in the off-state of the synchronous rectification transistor 12, the primary control signal generation circuit 14 may determine whether the synchronous rectification transistor 12 is in an off-state through a state detection. Alternatively, in the off-state of the synchronous rectification transistor 12, the secondary control signal generation circuit 13 may generate and output an off-state signal to the primary control signal generation circuit 14 to notify the primary control signal generation circuit 14 that the synchronous rectification transistor 12 is now in an off-state. Moreover, there may be control logic in the primary control signal generation circuit 14, which causes the primary control signal generation circuit 14 to turn on the primary switching transistor 11 at instant t5.

The control circuit provided herein can utilize the voltage signal of the secondary winding alone, or together with a direct sample of the current flowing through the synchronous rectification transistor, to control the synchronous rectification transistor to be turned on or off, thereby decoupling the turn-off of the synchronous rectification transistor from the turn-on of the primary witching transistor. This prevents simultaneous conduction of the primary and secondary circuits and imparts improved conversion efficiency to the isolated power supply. Moreover, it enables the conduction time of the secondary synchronous rectification transistor to vary with the current flowing through the secondary synchronous rectification transistor in a self-adaptive manner. That is, the greater the secondary current flowing through the synchronous rectification transistor, the longer the conduction time, while the smaller the secondary current flowing through the synchronous rectification transistor, the shorter the conduction time. This allows even more precise control of the conduction time of the synchronous rectification transistor, resulting in an increase in efficiency.

The following description is set forth in the context of the voltage signal of the secondary winding being taken as the first electrical signal as an example.

Figure 2:
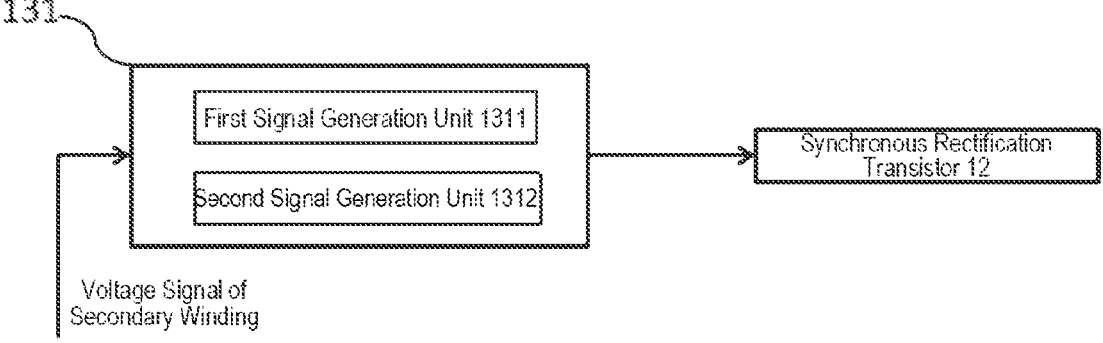
FIG. 2 is a schematic circuit diagram of a control signal generation unit according to an embodiment of the disclosure.

In one possible embodiment, referring to FIG. 2, the secondary control signal generation circuit 13 may include a control signal generation unit 131.

For example, an input terminal of the control signal generation unit 131 may be electrically connected to the secondary winding, and its output terminal may be electrically connected to an input terminal of the synchronous rectification transistor 12.

For example, the control signal generation unit 131 may be configured to: determine an instant of reaching the preset turn-on voltage value by the voltage signal of the secondary winding as a turn-on instant of the synchronous rectification transistor 12; after the elapse of a predetermined period of time following the turn-on of the synchronous rectification transistor 12, determine that the synchronous rectification transistor reaches a steady state, and detect and obtain the first value of the first electrical signal; derive the second value from the first value; determine an instant of reaching the second value by the first electrical signal as a turn-off instant of the synchronous rectification transistor 12; and generate a switching signal based on the turn-on and turn-off instants of the synchronous rectification transistor 12 and output the switching signal to the synchronous rectification transistor 12. For example, referring to FIG. 4, the preset turn-on voltage value may correspond to U1, and the control signal generation unit 131 may determine instant t1 (when the voltage signal of the secondary winding reaches this first preset voltage value) as a turn-on instant of the synchronous rectification transistor 12. With continued reference to FIG. 4, after a predetermined period of time (Tx) after instant t1 (when the synchronous rectification transistor 12 is turned on), the voltage signal or current signal of the secondary winding is sampled, and the first electrical signal is obtained (i.e., U3 of the voltage signal of the secondary winding, or I3 of the current signal of the secondary winding), followed by deriving the second value from the first value according to the predetermined proportion (see the above exemplary description). For example, the second value may correspond to U4 of the voltage signal, or I4 of the current signal, and instant t4 may be determined as a turn-off instant of the synchronous rectification transistor 12. Based on the turn-on and turn-off instants of the synchronous rectification transistor 12, the control signal generation unit 131 may generate a switching signal to the synchronous rectification transistor 12. For example, the control signal generation unit 131 may start outputting a high-level signal (i.e., the switching signal) to the synchronous rectification transistor at the turn-on instant thereof and stop outputting the high-level signal at the turn-off instant of the synchronous rectification transistor. In this way, the synchronous rectification transistor can remain in an on-state over the time duration of the high-level signal.

The control circuit provided herein can utilize either or both of the voltage and current signals of the secondary winding to determine turn-on and turn-off instants of the synchronous rectification transistor and switch the state of the synchronous rectification transistor, thereby achieving self-adaptive turn-on and turn-off control over the synchronous rectification transistor.

In one possible embodiment, referring to FIG. 2, the control signal generation unit 131 may include a first signal generation unit 1311 and a second signal generation unit 1312.

For example, an input terminal of the first signal generation unit 1311 may be electrically connected to the node, to which the secondary winding and the synchronous rectification transistor are connected, and its output terminal may output a turn-on determination signal. An input terminal of the second signal generation unit 1312 may be electrically connected to the secondary winding, and its output terminal may be electrically connected to the synchronous rectification transistor 12.

For example, the first signal generation unit 1311 may be configured to determine an instant when the voltage at the node between the synchronous rectification transistor and the secondary winding reaches the preset turn-on voltage value as the turn-on instant of the synchronous rectification transistor and responsively generate a turn-on determination signal, which generates a rising edge of the control signal for the synchronous rectification transistor.

For example, referring to FIG. 4, the preset turn-on voltage value may correspond to U1, and the first signal generation unit 1311 may generate a turn-on determination signal at instant t1 (when the voltage signal of the secondary winding reaches the preset turn-on voltage value), which then generates a rising edge of the switching signal. In other words, the first signal generation unit 1311 determines that the control signal for the synchronous rectification transistor transitions high (i.e., the aforementioned high-level signal) at instant t1 to control the synchronous rectification transistor 12 to be turned on.

For example, the second signal generation unit 1312 may be configured to: detect the first electrical signal and obtain the first value at an instant when the synchronous rectification transistor 12 reaches a steady state after it is turned on; derive the second value from the first value; determine an instant when the first electrical signal reaches the second value as a turn-off instant of the synchronous rectification transistor 12; and based on the turn-off instant of the synchronous rectification transistor 12, generate a turn-off determination signal, which generates a falling edge of the control signal for the synchronous rectification transistor. For example, with continued reference to FIG. 4, after the elapse of a predetermined period of time (Tx) after instant t1 (when the synchronous rectification transistor is turned on), the first value of the first electrical signal (i.e., U3 of the voltage signal of the secondary winding, or I3 of the current signal of the secondary winding) may be detected and obtained, and the second value may be derived from the first value according to the predetermined proportion (see the above exemplary description). Upon the current signal reaching I4, or upon the voltage signal reaching U4 at instant t4, which corresponds to the second value, instant t4 is determined as a turn-off instant of the synchronous rectification transistor 12. In other words, second signal generation unit 1312 determines that the control signal for the synchronous rectification transistor transitions low (i.e., the aforementioned low-level signal) at instant t4 to control the synchronous rectification transistor 12 to be turned off.

Figure 3:
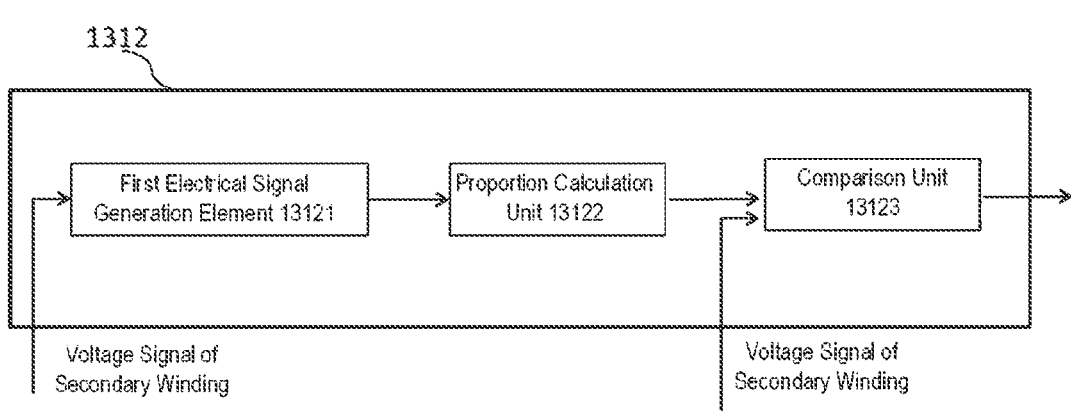
FIG. 3 is a schematic circuit diagram of a second signal generation unit according to an embodiment of the disclosure.

In one possible embodiment, referring to FIG. 3, the second signal generation unit 1312 may include a first electrical signal generation element 13121, a proportion calculation unit 13122 and a voltage comparison unit 13123.

For example, the first electrical signal generation element 13121 may be configured to sample and hold the first electrical signal. An input terminal of the proportion calculation unit 13122 may be electrically connected to an output terminal of the first electrical signal generation unit. A first input terminal of the voltage comparison unit 13123 may be electrically connected to an output terminal of the proportion calculation unit 13122, a second input terminal thereof may receive a turn-off determination signal output from a first electrical signal output terminal.

For example, the first electrical signal generation element 13121 may be configured to sample, hold and output the first electrical signal. The first value of the first electrical signal may be equal to a corresponding value of the voltage or current signal of the secondary winding after a predetermined period of time after the synchronous rectification transistor 12 is turned on. For example, the predetermined period of time may be equal to Tx in FIG. 4. Referring to FIG. 4, the synchronous rectification transistor 12 may be turned on at instant t2, and after the elapse of Tx after the synchronous rectification transistor 12 is turned on (i.e., at instant t3), the voltage signal of the secondary winding (i.e., a voltage on the synchronous rectification transistor) may reach U3. That is, the first value of the first electrical signal may become equal to U3 in FIG. 4. Alternatively, after the elapse of Tx after the synchronous rectification transistor 12 is turned on (i.e., at instant t3), the current signal of the secondary winding (i.e., the current flowing through the synchronous rectification transistor) may reach I3. That is, the first value of the first electrical signal may become equal to I3 in FIG. 4. At this point, the first electrical signal generation element 13121 may hold and output a signal indicating a voltage value corresponding to U3, or a signal indicating a current value corresponding to I3. The first electrical signal generation element 13121 may be implemented by a voltage holding circuit or a current holding circuit known in the art, or by other techniques, and further description thereof is omitted herein for the sake of brevity.

For example, the proportion calculation unit 13122 may be configured to derive the second value from the first value of the first electrical signal according to the predetermined proportion and to output the second value. For example, continuing the above example in which the predetermined proportion is ⅕ and the first value of the first electrical signal is −5 mV, after receiving the first value of the first electrical signal from the first electrical signal generation element 13121, the proportion calculation unit 13122 may determine the second value to be −1 mV from the first value (−5 mV) according to the predetermined proportion (⅕) and output a signal indicating −1 mV to the comparison unit 13123. Continuing the above second example in which the predetermined proportion is ⅕ and the first value is −5 mA, after receiving the first value from the first electrical signal generation element 13121, the proportion calculation unit 13122 may determine the second value to be −1 mA from the first value (−5 mA) according to the predetermined proportion (⅕) and output a signal indicating −1 mA to the comparison unit 13123. Those of ordinary skill in the art would appreciate that, no matter whether the second value indicates a current or a voltage, the comparison and calculation unit 13122 can be output in the form of either a voltage signal or a current signal. This may be implemented using any suitable conventional technique, though further description thereof is omitted herein for the sake of brevity.

For example, the comparison unit 13123 may be configured to compare the second value with the first electrical signal and, if the first electrical signal reaches the second value, generate and output a turn-off determination signal indicating the turn-off instant of the synchronous rectification transistor, which then generates a falling edge of the control signal for the synchronous rectification transistor. For example, referring to FIG. 4, the second value may correspond to U4. The first electrical signal, which is a sample of the voltage signal of the secondary winding, may reach the second value at instant t4. In response, the comparison unit 13123 may generate a turn-off determination signal, which then generates a falling edge of the control signal for the synchronous rectification transistor and thereby turns off the synchronous rectification transistor. As another example, the second value may correspond to I4. In this case, the first electrical signal, which is a sample of the current flowing through the synchronous rectification transistor, may reach the second value at instant t4. In response, the comparison unit 13123 may generate a turn-off determination signal, which then generates a falling edge of the control signal for the synchronous rectification transistor and thereby turns off the synchronous rectification transistor.

In one possible embodiment, the comparison unit may include a voltage comparator for comparing voltage signals.

For example, a first input terminal of the voltage comparator may be electrically connected to the output terminal of the proportion calculation unit and receive a voltage signal, which may represent the second value corresponding to either a current or voltage value. A second input terminal of the voltage comparator may receive the other voltage signal, which may represent either the voltage across the secondary winding, or the current flowing through the synchronous rectification transistor (i.e., flowing through the secondary winding). The voltage comparator may be structured as is conventional, and further description thereof is omitted herein for the sake of brevity.

In one possible embodiment, the comparison unit may include a current comparator for comparing current signals.

For example, a first input terminal of the current comparator may be electrically connected to the output terminal of the proportion calculation unit and receive a current signal, which may represent the second value corresponding to either a current or voltage value. A second input terminal of the current comparator may receive the other current signal, which may represent either the voltage across the secondary winding, or the current flowing through the synchronous rectification transistor (i.e., flowing through the secondary winding). The current comparator may be structured as is conventional, and further description thereof is omitted herein for the sake of brevity.

Figure 5:
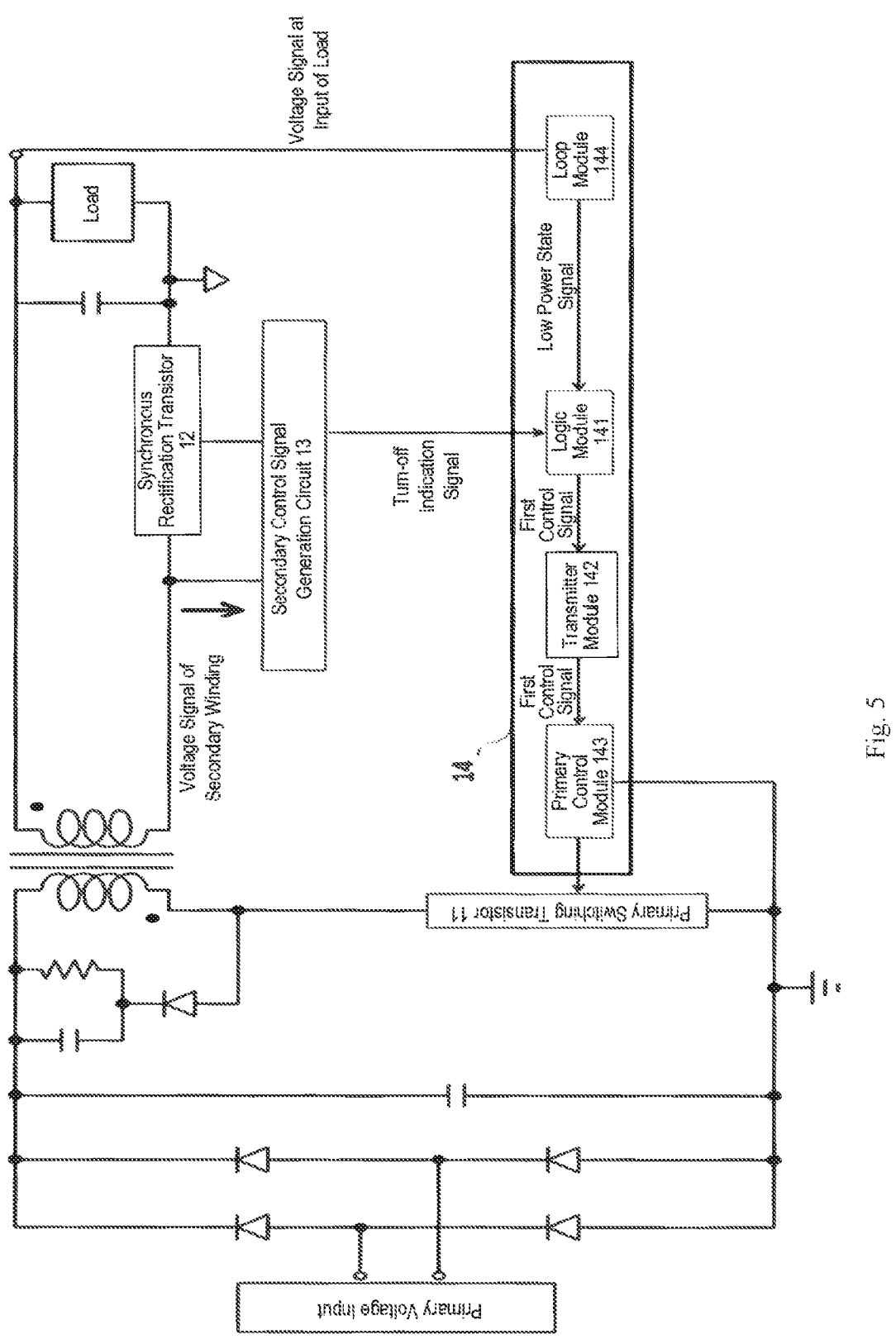
FIG. 5 is a schematic circuit diagram of an isolated power supply according to an embodiment of the present disclosure.

In one possible embodiment, referring to FIG. 5, the primary switch control circuit 14 may include a logic module 141, a transmitter module 142 and a primary control module 143.

For example, an input terminal of the logic module 141 may be electrically connected to an output terminal of the secondary control signal generation circuit 13. An input terminal of the transmitter module 142 may be electrically connected to an output terminal of the logic module 141. An input terminal of the primary control module 143 may be coupled to an output terminal of the transmitter module 142, and an output terminal of the primary control module 143 may be electrically connected to a control terminal of the primary switching transistor 11.

For example, the logic module 141 may be configured to generate and output a first control signal in an off-state of the synchronous rectification transistor 12. The transmitter module 142 may be configured to, upon receiving the first control signal, pass the first control signal on to the primary control module 143. The primary control module 143 may be configured to, when receiving the first control signal, to bring the primary switching transistor into an on-state. For example, the logic module 141 may determine whether the synchronous rectification transistor 12 has been turned off, by receiving an off-state signal from the secondary control signal generation circuit 13, or through performing state detection on the synchronous rectification transistor 12. Thus, when the synchronous rectification transistor 12 is in an off-state, the logic module 141 can be made aware of the synchronous rectification transistor 12 is in an off-state and responsively to turn the primary switching transistor 11 on. To this end, the logic module 141 may generate the first control signal, which may be then transmitted by the transmitter module 142 to the primary control module 143. Upon the receipt of the first control signal, the primary control module 143 may generate and output a turn-on signal to the primary switching transistor 11, to turn on the primary switching transistor 11.

In one possible embodiment, referring to FIGS. 1 and 5, the conduction time of the synchronous rectification transistor 12 may be in a linear relationship with the absolute value of the current flowing through the synchronous rectification transistor at the instant when it reaches a steady state. Referring to FIG. 4, the current flowing through the synchronous rectification transistor when it reaches a steady state after it is turned on may correspond to I3 of the current signal of the secondary winding. If the current I3 drops from −10 mA to −20 mA, then the absolute value of the current flowing through the synchronous rectification transistor at the time when it reaches a steady state (i.e., the first value) will increase. However, as a slope of the current from I3 to I4 is related to the inductance of the secondary winding and other factors, it typically remains unchanged. Therefore, if the predetermined proportion is ⅕ as an example, an absolute current change from the first value (−20 mA) to the second value (−4 mA) will be 16 mA, much greater than the previous absolute current change 8 mA from first value (−10 mA) to the second value (−2 mA). In case of the slope of current remaining the same, the time required for the change will be doubled. Likewise, if the current I3 rises from −10 mA to −5 mA, then the absolute value of the current flowing through the synchronous rectification transistor at the time when it reaches a steady state will decrease. If the predetermined proportion is ⅕ as an example, the time required to change from the first value (−5 mA) to the second value (−1 mA) will be half of the previous time. Since the conduction time of the synchronous rectification transistor consists of the period of time from the turn-on to the instant of reaching a steady state and the period of time required by the current to rise from the first value to the second value, and because the period of time from the turn-on to the instant of reaching a steady state is a predefined constant value, the conduction time of the synchronous rectification transistor 12 is in a linear relationship with the absolute value of the current flowing through the synchronous rectification transistor at the instant of reaching a steady state.

Therefore, the control circuit provided herein is able to extend the conduction time of the synchronous rectification transistor in response to an increase in the current flowing through the synchronous rectification transistor when it is turned on. Thus, it enables energy transmitted from the primary side to be fully utilized in the secondary circuit, resulting in increased conversion efficiency of the isolated power supply.

In another aspect of this disclosure, as shown in FIG. 1, there is also provided an isolated power supply comprising the control circuit as defined above.

The descriptions of the various embodiments of this disclosure are presented for purposes of illustration, but are not intended to be exhaustive or limited to the embodiments disclosed. Many modifications and variations will be apparent to those of ordinary skill in the art without departing from the scope and spirit of the invention. The terminology used herein is chosen to best explain the principles of the embodiment, the practical application or technical improvement over technologies found in the marketplace, or to enable others of ordinary skill in the art to understand the embodiments disclosed herein.

What is claimed is:

1. A control circuit for an isolated power supply, wherein the isolated power supply comprises: a transformer comprising a primary winding and a secondary winding; a primary switching transistor coupled to the primary winding; and a synchronous rectification transistor coupled to the secondary winding, wherein the control circuit comprises:
    a secondary control signal generation circuit, comprising:
        an input terminal at least electrically connected to a node, to which the secondary winding and the synchronous rectification transistor are connected; and an output terminal for outputting a control signal for the synchronous rectification transistor, wherein after the primary switching transistor is turned off, the secondary control signal generation circuit is configured to provide an instruction to turn on the synchronous rectification transistor when detecting that a voltage at the node reaches a preset turn-on voltage value, wherein the secondary control signal generation circuit is configured to detect a first electrical signal and to obtain a first value at an instant, at which the synchronous rectification transistor reaches a steady state after being turned on, wherein the first electrical signal indicates a current flowing through the synchronous rectification transistor, wherein the secondary control signal generation circuit is further configured to derive a second value from the first value, wherein when further detecting that the first electrical signal reaches the second value, the secondary control signal generation circuit is configured to provide an instruction to turn off the synchronous rectification transistor, and wherein the second value is a non-zero value and is a multiplication of the first value and a predetermined proportion.

2. The control circuit according to claim 1, wherein the instant, at which the synchronous rectification transistor reaches the steady state after being turned on, is an instant following an elapse of a predetermined delay time period after the synchronous rectification transistor is turned on.

3. The control circuit according to claim 1, wherein the synchronous rectification transistor is electrically connected between the secondary winding and a reference at a secondary side, and wherein the first electrical signal is sampled from a voltage signal at the node.

4. The control circuit according to claim 3, wherein the secondary control signal generation circuit is configured to determine whether the voltage at the node reaches the preset turn-on voltage value by using the first electrical signal.

5. The control circuit according to claim 1, wherein the first electrical signal is sampled from a current signal flowing through the synchronous rectification transistor.

6. The control circuit according to claim 1, wherein the secondary control signal generation circuit comprises:

a first signal generation unit, comprising: an input terminal electrically connected to the node; and an output terminal for outputting a turn-on determination signal, wherein the first signal generation unit is configured to determine an instant of reaching the preset turn-on voltage value by the voltage at the node as a turn-on instant of the synchronous rectification transistor and to generate the turn-on determination signal, and wherein the turn-on determination signal is configured to generate a rising edge of the control signal for the synchronous rectification transistor; and a second signal generation unit, comprising: an input terminal for receiving the first electrical signal; and an output terminal for outputting a turn-off determination signal, wherein the second signal generation unit is configured to: detect the first value of the first electrical signal at the instant, at which the synchronous rectification transistor reaches the steady state after being turned on; derive the second value from the first value; determining an instant of reaching the second value by the first electrical signal as a turn-off instant of the synchronous rectification transistor; and generate the turn-off determination signal, wherein the turn-off determination signal is configured to generate a falling edge of the control signal for the synchronous rectification transistor.

7. The control circuit according to claim 6, wherein the second signal generation unit comprises:

a first electrical signal generation element, comprising an input terminal for sampling and holding the first electrical signal, wherein the first electrical signal generation unit is configured to output the first value;

a proportion calculation unit, comprising an input terminal electrically connected to an output terminal of the first electrical signal generation element, wherein the proportion calculation unit is configured to derive the second value from the first value according to the predetermined proportion and to output the second value; and a comparison unit, comprising: a first input terminal electrically connected to an output terminal of the proportion calculation unit; and a second input terminal for receiving the first electrical signal, wherein the comparison unit is configured to compare the second value with the first electrical signal and to output, if the first electrical signal reaches the second value, the turn-off determination signal, wherein the turn-off determination signal provides an indication of the turn-off instant of the synchronous rectification transistor.

8. The control circuit according to claim 7, wherein the comparison unit is a current comparator or a voltage comparator.

9. The control circuit according to claim 1, wherein a conduction time of the synchronous rectification transistor is positively correlated to the first value.

10. An isolated power supply comprising the control circuit according to claim 1 and a primary control signal generation circuit.

11. A control circuit for an isolated power supply, wherein the control circuit is used to control a synchronous rectification transistor on a secondary side of the isolated power supply, wherein the synchronous rectification transistor is coupled to a secondary winding, wherein the control circuit controls a conduction time of the synchronous rectification transistor in a self-adaptive manner in each operation cycle, wherein the conduction time of the synchronous rectification transistor is determined by a value of a current flowing through the synchronous rectification transistor at an instant, at which the synchronous rectification transistor reaches a steady state after being turned on, wherein a first value of a current flowing through the synchronous rectification transistor is obtained at an instant where the synchronous rectification transistor reaches a steady state after being turned on, wherein when the first value reaching a second value is detected, an instruction is provided to turn off the synchronous rectification transistor, and wherein the second value is a non-zero value and is a multiplication of the first value and a predetermined proportion.

12. The control circuit according to claim 11, wherein the conduction time of the synchronous rectification transistor is in a linear relationship with the value of the current flowing through the synchronous rectification transistor at the instant, at which the synchronous rectification transistor reaches the steady state after it is turned on.

13. The control circuit according to claim 11, wherein the conduction time of the synchronous rectification transistor is mapped to the value of the current flowing through the synchronous rectification transistor at the instant through a mapping table, at which the synchronous rectification transistor reaches the steady state after being turned on.

14. The control circuit according to claim 11, wherein the instant, at which the synchronous rectification transistor reaches the steady state after being turned on, is a fixed instant after the synchronous rectification transistor is turned on.

15. The control circuit according to claim 11, wherein the current flowing through the synchronous rectification transistor is characterized by a voltage at a node, to which the secondary winding and the synchronous rectification transistor are connected, and wherein the control circuit is further configured to turn on and turn off the synchronous rectification transistor based on a voltage signal at the node.

* * * * *